(12) United States Patent
Ishimura

(10) Patent No.: US 9,660,957 B2
(45) Date of Patent: May 23, 2017

(54) INFORMATION PROCESSING APPARATUS AND RECORDING MEDIUM

(71) Applicant: FUJI XEROX CO., LTD, Minato-ku, Tokyo (JP)

(72) Inventor: Takanari Ishimura, Kanagawa (JP)

(73) Assignee: FUJI XEROX CO., LTD, Tokyo (JP)

(*) Notice: Subject to any disclaimer, the term of this patent is extended or adjusted under 35 U.S.C. 154(b) by 220 days.

(21) Appl. No.: 14/221,443

(22) Filed: Mar. 21, 2014

(65) Prior Publication Data

US 2014/0372575 A1 Dec. 18, 2014

(30) Foreign Application Priority Data

Jun. 18, 2013 (JP) .................................. 2013-127660

(51) Int. Cl.
*H04L 29/12* (2006.01)
(52) U.S. Cl.
CPC ...... *H04L 61/6068* (2013.01); *H04L 61/2015* (2013.01); *H04L 61/2038* (2013.01); *H04L 61/6077* (2013.01)
(58) Field of Classification Search
CPC ............. H04L 61/6068; H04L 61/2015; H04L 61/2038; H04L 61/6077
USPC .................................................. 709/220, 221
See application file for complete search history.

(56) References Cited

U.S. PATENT DOCUMENTS

| 7,299,294 | B1* | 11/2007 | Bruck | ............... | H04L 29/12216 |
| | | | | | 709/201 |
| 7,907,515 | B2* | 3/2011 | Fukasawa | ............. | G06F 13/128 |
| | | | | | 370/216 |

| 2004/0151162 | A1* | 8/2004 | Ramaswamy | ........ | H04W 40/02 |
| | | | | | 370/352 |
| 2004/0151202 | A1* | 8/2004 | Mandavilli | ............. | H04L 45/02 |
| | | | | | 370/463 |
| 2007/0133544 | A1 | 6/2007 | Shida | | |
| 2007/0195729 | A1* | 8/2007 | Li | ....................... | H04L 29/1232 |
| | | | | | 370/328 |
| 2012/0069787 | A1 | 3/2012 | Tamura | | |

FOREIGN PATENT DOCUMENTS

| JP | 2002-345027 A | 11/2002 |
| JP | 2007-166069 A | 6/2007 |
| JP | 2012-70041 A | 4/2012 |

OTHER PUBLICATIONS

Communication dated Jul. 12, 2016, from the Japanese Patent Office in counterpart Japanese application No. 2013-127660.

* cited by examiner

*Primary Examiner* — Michael C Lai
(74) *Attorney, Agent, or Firm* — Sughrue Mion, PLLC

(57) ABSTRACT

An information processing apparatus includes plural network interfaces, a specifying unit, a setting unit, and an assigning unit. The plural network interfaces include a first network interface for connection of the apparatus to a network, and a second network interface for direct wireless connection of another device to the apparatus. The specifying unit specifies a subnet by way of which data transmitted from the first network interface pass. The setting unit sets a network address that belongs to a subnet that is different from the specified subnet to the second network interface. The assigning unit assigns a network address that belongs to a subnet that is the same as the network address set to the second network interface to the other device.

10 Claims, 3 Drawing Sheets

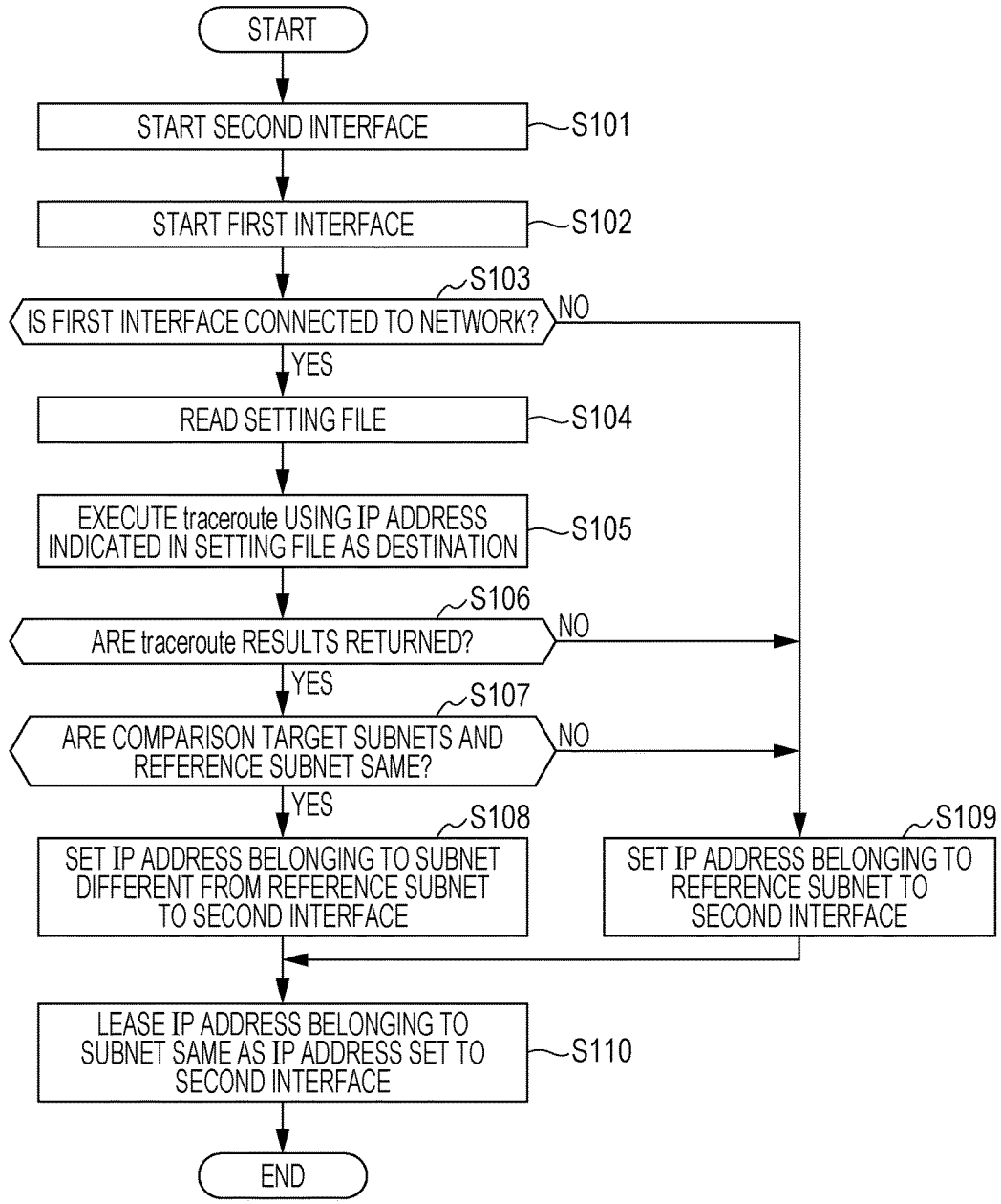

INFORMATION PROCESSING APPARATUS AND RECORDING MEDIUM

CROSS-REFERENCE TO RELATED APPLICATIONS

This application is based on and claims priority under 35 USC 119 from Japanese Patent Application No. 2013-127660 filed Jun. 18, 2013.

BACKGROUND

Technical Field

The present invention relates to an information processing apparatus and a recording medium.

SUMMARY

According to an aspect of the present invention, there is provided an information processing apparatus including: plural network interfaces including a first network interface for connection of the apparatus to a network and a second network interface for direct wireless connection of another device to the apparatus; a specifying unit that specifies a subnet by way of which data transmitted from the first network interface pass; a setting unit that sets a network address that belongs to a subnet that is different from the specified subnet to the second network interface; and an assigning unit that assigns a network address that belongs to a subnet that is the same as the network address set to the second network interface to the other device.

BRIEF DESCRIPTION OF THE DRAWINGS

An exemplary embodiment of the present invention will be described in detail based on the following figures, wherein:

FIG. 4 is a flowchart illustrating an example of a process executed by the information processing apparatus.

DETAILED DESCRIPTION

An exemplary embodiment of the present invention will be described in detail below with reference to the drawings.

Figure 1:
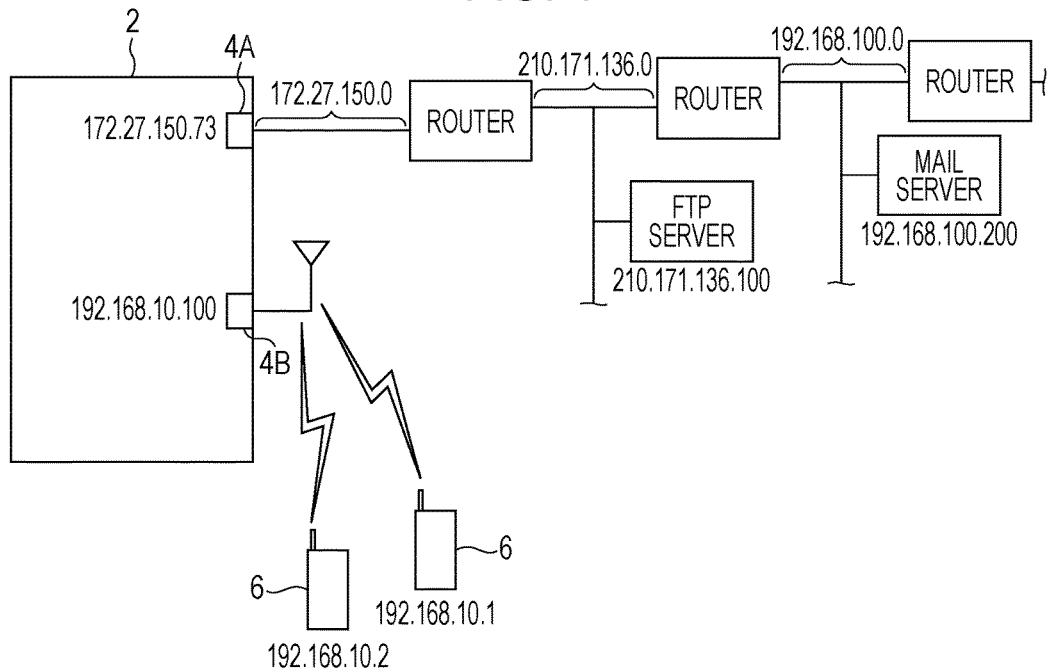
FIG. 1 illustrates a network configuration including an information processing apparatus.

FIG. 1 illustrates a network configuration including an information processing apparatus 2. The information processing apparatus 2 is a multi function printer, for example, and includes a network interface 4A and a network interface 4B. The network interface 4A is a network interface for connection of the information processing apparatus 2 to a network. The network interface 4A is provided with an Internet Protocol (IP) address leased from a Dynamic Host Configuration Protocol (DHCP) server (not illustrated). In FIG. 1, an IP address "172.27.150.73" is set to the network interface 4A. Although the network interface 4A is a wired network interface in the description herein, the network interface 4A may also be a wireless network interface.

As illustrated in FIG. 1, there are subnets such as "172.27.150.0", "210.171.136.0", and "192.168.100.0" beyond the network interface 4A. Various information processing apparatuses are subordinate to each subnet. For example, a File Transfer Protocol (FTP) server to be utilized by the information processing apparatus 2 is subordinate to the subnet "210.171.136.0". Meanwhile, a mail server to be utilized by the information processing apparatus 2 is subordinate to the subnet "192.168.100.0".

The network interface 4B is a wireless network interface for wireless direct connection of portable terminals 6 of users to the information processing apparatus 2. In the exemplary embodiment, the information processing apparatus 2 acts as a group owner that serves as an access point, and the portable terminals 6 are directly connected to the information processing apparatus 2 by the Wi-Fi Direct standard. That is, the network interface 4B is principally provided with a reference IP address "192.168.10.100" determined in advance. Then, in response to IP address acquisition requests from the portable terminals 6, the information processing apparatus 2 as a group owner leases to the portable terminals 6 as clients IP addresses that belong to a subnet that is the same as the IP address of the network interface 4B, such as "192.168.10.1" and "192.168.10.2". The leased IP addresses are assigned to the portable terminals 6 as clients which made the IP address acquisition requests.

It is assumed that there is a subnet "192.168.10.0", which is the same as the reference IP address, beyond the network interface 4A. In this case, erroneous data transmission may be caused.

Figure 2:
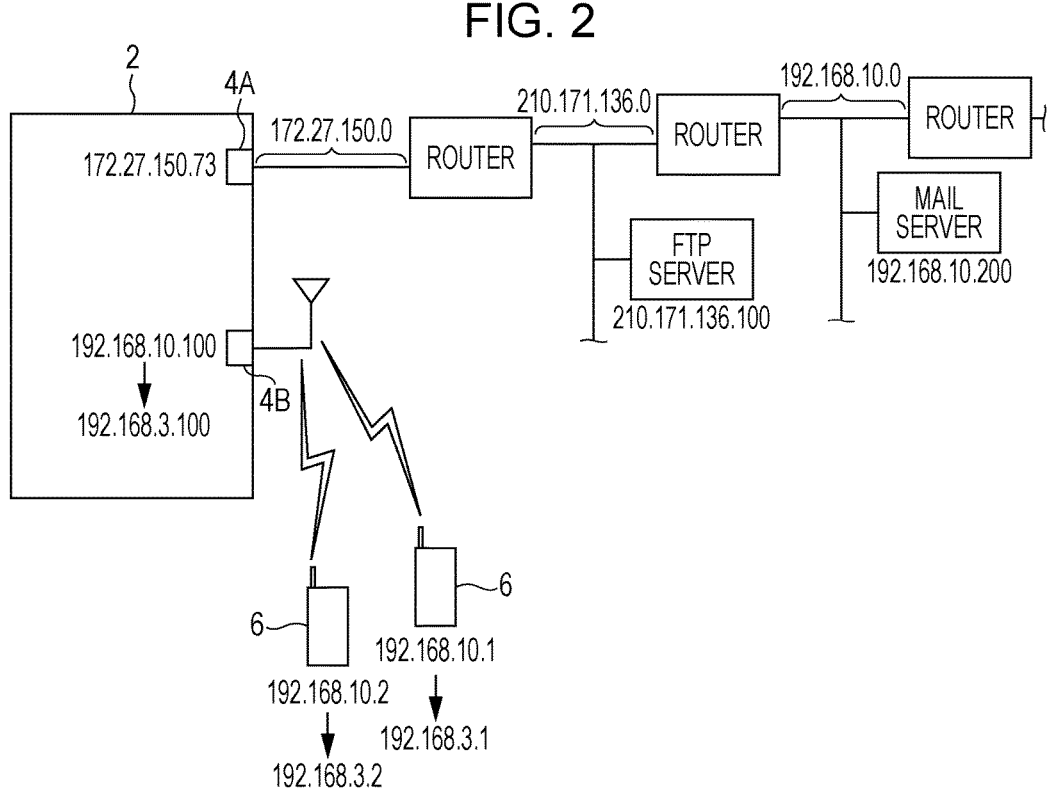
FIG. 2 illustrates a network configuration including the information processing apparatus.

For example, it is assumed that a mail server is subordinate to a subnet "192.168.10.0", which is the same as the reference IP address, as illustrated in FIG. 2. In this case, when data are transmitted using the IP address of the mail server as the destination, the data may be transmitted not from the network interface 4A but from the network interface 4B.

Meanwhile, for example, it is assumed that an IP address that belongs to a subnet that is the same as the reference IP address is set to the network interface 4A. In this case, it may be difficult to determine from which network interface data should be transmitted, and a wrong network interface may be selected to transmit the data.

With the information processing apparatus 2, in this respect, an IP address that belongs to a subnet that is different from the subnets provided beyond the network interface 4A is set to the network interface 4B. Specifically, in the case where there is a subnet "192.168.10.0", which is the same as the reference IP address, beyond the network interface 4A, not the reference IP address "192.168.10.100" but an IP address (in FIG. 2, "192.168.3.100") that belongs to a subnet (in FIG. 2, "192.168.3.0") that is different from the reference IP address is set to the network interface 4B as illustrated in FIG. 2.

A technology for setting an IP address of the network interface 4B will be described below.

Figure 3:
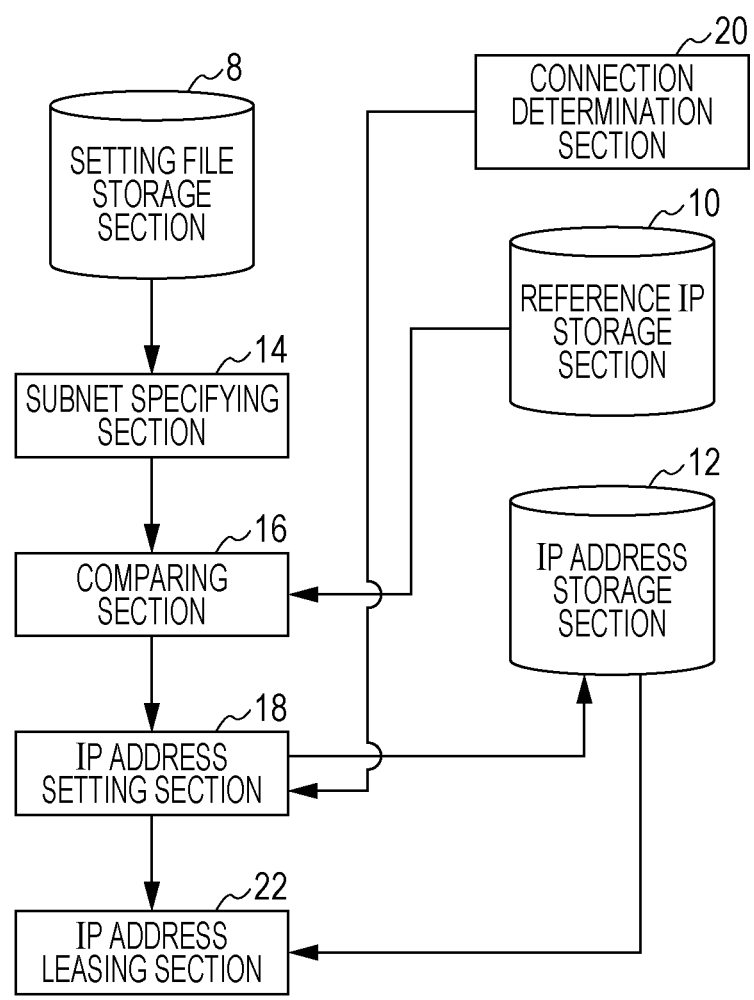
FIG. 3 is a functional block diagram illustrating a group of functions implemented by the information processing apparatus.

FIG. 3 is a functional block diagram illustrating a group of functions implemented by the information processing apparatus 2. The information processing apparatus 2 includes a setting file storage section 8, a reference IP storage section 10, an IP address storage section 12, a subnet specifying section 14, a comparing section 16, an IP address setting section 18, a connection determination section 20, and an IP address leasing section 22. These functions are implemented by the information processing apparatus 2, which is a computer including a control unit such as a microprocessor, a storage unit such as a memory, and a network interface for data transmission and reception, by reading and executing a program stored in a computer readable information storage medium (such as an optical disk, a magnetic disk, a magnetic tape, an magneto-optical disk, and a flash memory, for example). The program may be supplied to the information processing apparatus 2 which is a computer via a data communication network such as the Internet.

Each of the functions will be described below. The setting file storage section 8 stores a setting file. The setting file indicates an IP address set in advance to the information processing apparatus 2 as a candidate data transmission destination. For example, the setting file indicates IP addresses of a mail server and an FTP server.

The reference IP storage section 10 stores a reference IP address "192.168.10.100". The IP address storage section 12 stores the IP addresses set to the network interfaces of the information processing apparatus 2 in association with Media Access Control (MAC) addresses of the network interfaces.

The subnet specifying section 14 specifies a subnet by way of which data transmitted from the network interface 4A pass as a comparison target subnet. Specifically, the subnet specifying section 14 references the setting file to specify the IP address set in advance to the information processing apparatus 2, and executes a so-called "traceroute" command by designating the network interface 4A using the specified IP address as the destination. Consequently, the subnet specifying section 14 transmits data from the network interface 4A, and obtains traceroute results which are the results of executing the "traceroute" command. Then, the subnet specifying section 14 specifies a subnet by way of which the transmitted data pass before reaching the destination of the "traceroute" command as a comparison target subnet based on the traceroute results. In the exemplary embodiment, the number of hops designated for the "traceroute" command is "3". Therefore, a comparison target subnet with a number of hops from the network interface 4A of "3" or less is specified. The number of hops indicates the distance in the network from the network interface 4A. The number of hops to be specified may be a number other than "3".

The subnet specifying section 14 may read an IP address of the network interface 4A from the IP address storage section 12, and specify a subnet to which the IP address of the network interface 4A belongs as a comparison target subnet.

The comparing section 16 reads the reference IP address from the reference IP storage section 10. In addition, the comparing section 16 specifies a subnet "192.16.10.0" to which the reference IP address belongs as a reference subnet, and compares the reference subnet and the comparison target subnet with each other.

The IP address setting section 18 sets an IP address that belongs to a subnet that is different from the comparison target subnet to the network interface 4B. Specifically, in the case where the reference subnet "192.168.10.0" and the comparison target subnet are different from each other, the IP address setting section 18 sets an IP address that belongs to the reference subnet to the network interface 4B. That is, the IP address setting section 18 stores the reference IP address "192.168.10.100" in the IP address storage section 12 in association with the MAC address of the network interface 4B. In the case where the reference subnet and the comparison target subnet are the same as each other, on the other hand, the IP address setting section 18 sets an IP address that belongs to another subnet "192.168.3.0" that is different from the reference subnet to the network interface 4B. That is, the IP address setting section 18 stores an IP address "192.168.3.100" in the IP address storage section 12 in association with the MAC address of the network interface 4B.

In the case where the reference subnet "192.168.10.0" and the comparison target subnet are the same as each other, the IP address setting section 18 may transmit data from the network interface 4A using any IP address (for example, "192.168.3.100") that belongs to the other subnet "192.168.3.0" as the destination. Then, in the case where the transmitted data are not received by a host at the destination, the IP address setting section 18 may set an IP address "192.168.3.100" that belongs to the other subnet to the network interface 4B. In this way, the IP address setting section 18 may examine whether the other subnet "192.168.3.0" is actually provided beyond the network interface 4A, and set an IP address that belongs to the other subnet in the case where no such subnet is provided. In this case, the IP address setting section 18 may execute a so-called "ping" command by designating the network interface 4A using an IP address that belongs to the other subnet "192.168.3.0" as the destination. In addition, the IP address setting section 18 may determine whether or not the transmitted data are received by a host at the destination in accordance with whether or not the network interface 4A has received a predetermined Internet Control Message Protocol (ICMP) message (for example, a message "Destination Unreachable").

In the exemplary embodiment, the IP address setting section 18 sets an IP address that belongs to a subnet that is different from the comparison target subnet to the network interface 4B in the case where the network interface 4A is connected to a network, and the IP address setting section 18 unconditionally sets the reference IP address to the network interface 4B in the case where the network interface 4A is not connected to a network. The connection determination section 20 determines whether or not the network interface 4A is connected to a network.

In response to an IP address acquisition request from the portable terminal 6, the IP address leasing section 22 leases an IP address that belongs to a subnet that is the same as the IP address set to the network interface 4B to the portable terminal 6 which made the IP address acquisition request, and assigns the IP address to the portable terminal 6. Specifically, in the case where the network interface 4B receives an IP address acquisition request from the portable terminal 6, the IP address leasing section 22 reads the IP address of the network interface 4B from the IP address storage section 12. Then, the IP address leasing section 22 transmits a unique IP address that belongs to a subnet that is the same as the read IP address to the portable terminal 6 which made the IP address acquisition request from the network interface 4B.

In the information processing apparatus 2, in this way, an IP address that belongs to a different subnet from the subnets provided beyond the network interface 4A is set to the network interface 4B by the subnet specifying section 14 and the IP address setting section 18.

FIG. 4 is a flowchart illustrating an example of a process executed by the information processing apparatus 2. The process is executed in the case where the information processing apparatus 2 is started. In the following description of FIG. 4, the network interface 4A is referred to as a "first interface", and the network interface 4B is referred to as a "second interface".

First, the information processing apparatus 2 starts the second interface (S101). In addition, the information processing apparatus 2 starts the first interface (S102). In S102, an IP address leased from a DHCP server is set to the first interface, and stored in the IP address storage section 12.

Then, the information processing apparatus 2 determines, through the connection determination section 20, whether or not the first interface is connected to a network (S103). Specifically, the information processing apparatus 2 determines whether or not a network cable is connected to the first interface.

In the case where the first interface is connected to a network (Y in S103), the information processing apparatus 2 executes steps in and after S104. That is, the information processing apparatus 2 reads a setting file from the setting file storage section 8 (S104). Then, the information processing apparatus 2 executes, through the subnet specifying section 16, a "traceroute" command using an IP address indicated in the setting file as the destination (S105). The "traceroute" command is executed by designating the first interface. In addition, the number of hops is designated as "3".

Then, in the case where traceroute results are returned (Y in S106), the information processing apparatus 2 specified, through the subnet specifying section 16, subnets provided in a path from the first interface to the destination of the "traceroute" command as comparison target subnets based on the traceroute results. In addition, the information processing apparatus 2 compares, through the comparing section 16, each of the comparison target subnets and the reference subnet with each other, and determines whether or not each of the comparison target subnets and the reference subnet are the same as each other (S107).

Then, in the case where any of the comparison target subnets is the same as the reference subnet (Y in S107), the information processing apparatus 2 sets, through the IP address setting section 18, an IP address that belongs to a subnet that is different from the reference subnet to the second interface (S108). That is, in S108, the information processing apparatus 2 sets an IP address that belongs to a subnet that is different from any of the comparison target subnets to the second interface, and stores the IP address in the IP address storage section 12.

In the case where the first interface is not connected to a network (N in S103), in the case where traceroute results are not returned (N in S106), and in the case where any of the comparison target subnets is not the same as the reference subnet (N in S107), the information processing apparatus 2 sets, through the IP address setting section 18, an IP address that belongs to the reference subnet to the second interface (S109). That is, in S109, the information processing apparatus 2 sets the reference IP address to the second interface. In this way, an IP address is set to the second interface.

After that, in the case where the second interface receives an IP address acquisition request from the portable terminal 6, the information processing apparatus 2 leases, through the IP address leasing section 22, an IP address to the portable terminal 6 which made the IP address acquisition request. That is, the information processing apparatus 2 transmits a unique IP address that belongs to a subnet that is the same as the IP address set to the second interface to the portable terminal 6 which made the IP address acquisition request (S110).

Exemplary embodiments of the present invention are not limited to the exemplary embodiment described above.

For example, the information processing apparatus 2 may include three or more network interfaces including the network interface 4A and the network interface 4B. That is, the present invention may be applied to the information processing apparatus 2 including three or more network interfaces including the network interface 4A and the network interface 4B.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a plurality of network interfaces including:
      a first network interface configured to connect the apparatus to a network, and
      a second network interface configured to wirelessly connect another device to the apparatus;
   a specifying unit configured to determine a first network address of a first subnet by transmitting data from the first network interface and receiving a response from the first subnet, the response indicating the first network address;
   a setting unit configured to assign, in response to determining the first network address, a second network address of a second subnet, different from the first subnet, to the second network interface; and
   an assigning unit configured to assign a third network address, of the second subnet, to the other device, wherein
   the first network address, the second network address and the third network address are different than each other, and wherein
   the first subnet and the second subnet extend from the first network interface.

2. The information processing apparatus according to claim 1,
   wherein the setting unit is further configured to assign a network address of a predetermined reference subnet to the second network interface in response to the first subnet and the predetermined reference subnet having different addresses from each other, and is further configured to assign a network address that belongs to a subnet different from the predetermined reference subnet to the second network interface in response to the first subnet and the predetermined reference subnet having same addresses as each other.

3. The information processing apparatus according to claim 2, further comprising:
   a unit configured to determine whether or not the first network interface is connected to a network,
   wherein the setting unit is further configured to assign a network address of the predetermined reference subnet to the second network interface in response to a determination by the unit that the first network interface is not connected to a network.

4. The information processing apparatus according to claim 3, wherein the unit is further configured to make the determination by detecting whether a network cable is attached to the first interface.

5. The information processing apparatus according to claim 1, wherein the specifying unit is further configured to transmit the data from the first network interface to a predetermined network address.

6. The information processing apparatus according to claim 5,
wherein the specifying unit is further configured to transmit the data a distance from the first network interface, the distance being equal to or less than a predetermined distance.

7. The information processing apparatus according to claim 6, wherein the predetermined distance is a number of network hops from the first network interface.

8. The information processing apparatus according to claim 1,
wherein a fourth network address is assigned to the first network interface by a dynamic host configuration protocol (DHCP) server, and
the specifying unit is further configured to specify a subnet having the fourth network address assigned to the first network interface.

9. The information processing apparatus according to claim 1,
wherein the setting unit is further configured to transmit, from the first network interface, the data to a network address of another subnet that is different from the first subnet, and is further configured to assign the network address of the other subnet to the second network interface in response to an indication that the data is not received at the network address of the other subnet.

10. A non-transitory computer readable medium storing a program which when executed by a computer apparatus, which includes a plurality of network interfaces including a first network interface for connection of the apparatus to a network and a second network interface for direct wireless connection of another device to the apparatus, causes the computer apparatus to execute a process, the process comprising:
determining a first network address of a first subnet by transmitting data from the first network interface and receiving a response from the first subnet, the response indicating the first network address;
assigning, in response to determining the first network address, a second network address of a second subnet, different from the first subnet, to the second network interface; and
assigning a third network address, of the second subnet, to the other device, wherein
the first network address, the second network address and the third network address are different than each other, and wherein
the first subnet and the second subnet extend from the first network interface.

* * * * *